Feb. 19, 1935. H. KETEL 1,991,507
FIFTH WHEEL
Original Filed July 29, 1932
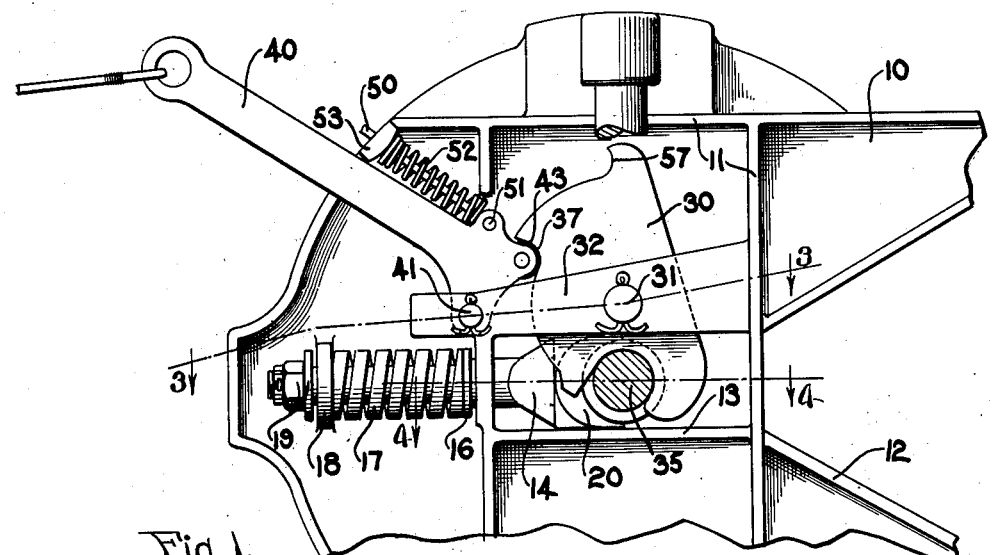
Fig. 1.
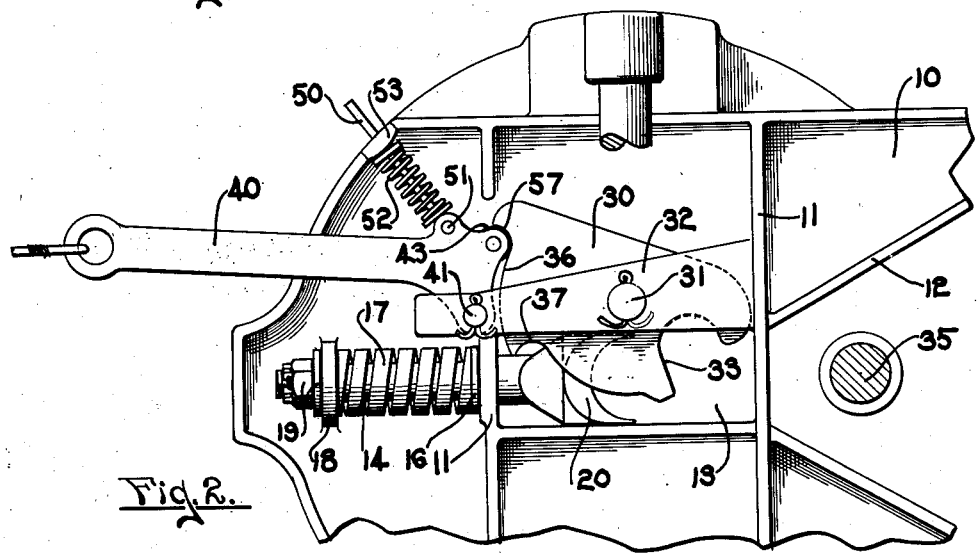
Fig. 2.
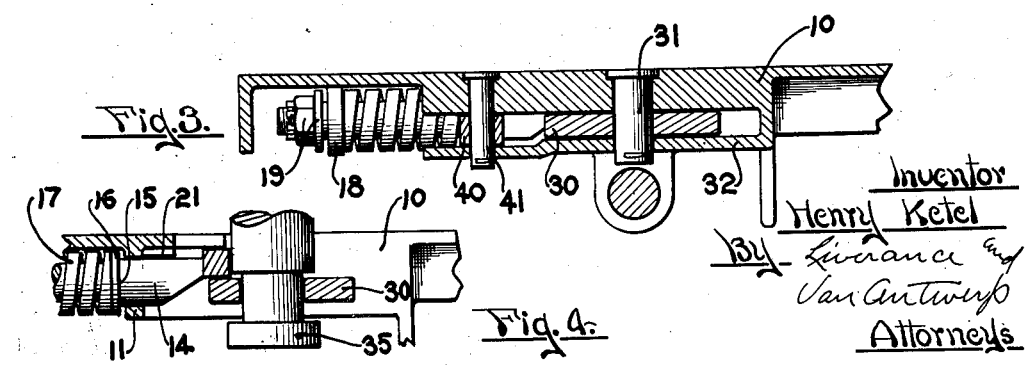
Inventor
Henry Ketel
By Lawrence and
Van Antwerp
Attorneys Patented Feb. 19, 1935

1,991,507

UNITED STATES PATENT OFFICE 1,991,507

FIFTH WHEEL

Henry Ketel, Muskegon, Mich., assignor to West Michigan Steel Foundry Co., Muskegon, Mich., a corporation of Michigan Application July 29, 1932, Serial No. 625,644
Renewed July 16, 1934

6 Claims. (Cl. 280—33.1)

This invention relates generally to a coupling device and more particularly to a coupling which is particularly adaptable to the fifth wheel of a tractor or truck or the like, such invention relating to the eliminating of lost motion whereby the king pin as well as other appurtenant parts are prevented from breaking due to impact therebetween.

Another object of the invention lies in its simplicity whereby it is economical to manufacture.

Further objects and advantages will be apparent from the following description.

In the drawing:—

Fig. 1 is an underplan view showing the king pin coupled onto the pulling element.

Fig. 2 shows the several parts in their unlocked position.

Fig. 3 is a sectional view taken along the line 3—3 of Fig. 1.

Fig. 4 is a fragmentary view taken along the line 4—4 of Fig. 1.

Similar numerals refer to similar parts throughout the several views.

Numeral 10 indicates the plate member generally, such having depending ribs 11 for the purpose of mounting and housing the several parts therein. The plate member 10 is mounted in any desired manner upon either the pulled or pulling unit, preferably the pulling unit.

The plate member 10 is formed with a tapered opening 12 which merges into a rectangularly shaped opening 13, and the rib 11 across the rear end of said opening has a plunger member 14 slidably mounted therein.

The plunger member 14 extends through one of the ribs 11 at one end of the rectangular opening 13 and also through a bearing lug 18 depending from the underside of the plate and it is shouldered at 15 and the washer 16 abuts against the shoulder. A heavy coiled spring 17 bears at one end against the washer 16 and at its other end it bears against the bearing lug 18 tending to thrust the plunger 14 forwardly. The rear end of the plunger is threaded and the nut and washer 19 are located thereon and the washer 19 striking the bearing lug 18 limits forward motion of the plunger. The forward end of the plunger 14 is provided with a head 20 having an arc-shaped socket and this head provides a shoulder which will engage a stop lug 21 formed on the underside of the plate 10 to limit rearward movement of the plunger.

A locking plate 30 is pivotally mounted by the pin 31 onto the plate member, such plate member having a lower extending member 32, see Fig. 3 and thus the locking plate 30 may oscillate about the pin 31. A recess 33 is formed in the locking plate, this recess receiving the king pin 35. And approximately opposite the recess 33 the edge of the locking plate is formed with an arcuate surface 36 terminating in a shoulder portion 37 as clearly shown in Figs. 1 and 2.

A lever member 40 is pivoted onto the plate member 10 and the previously referred to member 32 by means of the pin 41, this lever member having a roller 43 pivoted thereon. The roller member 43 rides against the arcuate surface 36 and abuts against the shoulder member 37 as clearly shown in Fig. 2. A pin member 50, see Figs. 1 and 2, is pivoted at 51 onto the lever member 40 and a spring 52 encircles this pin member 50 and abuts against a lug 53 this maintaining the roller 37 against the arcuate surface 36.

Operation

Before the device is in operative position, the king pin is in the position shown in Fig. 2 and is guided by means of the tapered sides 12 into the recess 33, the impact of the king pin 35 rotating the several parts to the position shown in Fig. 1. When the parts assume this position, the roller member 43 is urged against the arcuate surface 36 and snaps downwardly behind the shoulder 37 whereby the locking plate 30 is prevented from return movement and hence the king pin 35 is firmly held in position. The impact of the king pin 35 is taken care of by the plunger member 14, the king pin riding against the bifurcated pin 20 and slightly compressing the coiled spring 17. The coiled spring 17 is of extremely strong construction and pushes the king pin 35 outwardly and causes the shoulder 37 of the locking plate to bear tightly against the roller member 43 thus maintaining the several parts in connected relationship so as to prevent any lost motion whatsoever therebetween.

Release of the device is manually secured by rotating the lever 40 about its pivot 41, such withdrawing the roller 43 from behind the shoulder 37 and permitting the king pin to rotate the locking plate to the position shown in Fig. 2 where the frictional engagement of the roller against the second shoulder 57 prevents excessive movement of the locking plate and hence the locking plate is held ready for reengagement whenever such is desired.

Having thus described my invention, I desire it to be understood that the invention is in nowise limited to the particular illustrative em- bodiment disclosed, the scope thereof being set forth in the following claims.

I claim:

1. In a device of the character described, a plate member, said plate member having a rectangularly shaped recess therein adapted to receive a king pin therein, a locking plate movably mounted adjacent said recess, said locking plate having a recess therein, one side of said recess extending across the recess in the plate when the locking plate is in its unlocked position, whereby the king pin will engage thereagainst to turn the locking plate so that the other side of said recess will extend across the first mentioned recess to close the first mentioned recess, positive locking means for preventing return movement of the locking plate and spring means for preventing excessive movement of the locking plate in the other direction, said spring means also eliminating the lost motion in the several parts.

2. In a device of the character described, a plate member having a tapered opening therein, said tapered opening merging into a rectangularly shaped opening, a king pin adapted to be slidably engaged by the tapered opening and then guided into the rectangular opening, a locking plate pivotally mounted alongside of the said rectangular opening, said locking plate having a recess therein and an arcuate surface formed thereon, said recess being located so as to receive the king pin whereby pressure at the king pin will turn the locking plate about its pivot, a lever pivotally mounted on the plate member and having a locking roller mounted thereon, said locking roller engaging against the arcuate surface of the locking plate, spring means to normally urge the locking roller into engagement with the locking plate to frictionally engage the locking plate, a shoulder on the locking plate adapted to engage against the said locking roller to prevent unlocking movement of the said locking plate, and a spring abutment means slidably mounted upon the plate and including a plunger member located in the said rectangular opening whereby the king pin will abut thereagainst to prevent excessive inward movement thereof.

3. In combination, a plate having an opening therein adapted to receive a king pin, a locking plate pivotally mounted adjacent said opening, means whereby, when the king pin moves into said opening, the king pin engages the locking plate and moves it to locking position, means to hold the locking plate in locked position, said locking plate engaging the back side of the king pin in the locked position, yieldable means engaging the front side of the king pin whereby excessive inward movement of the king pin is prevented and whereby slack motion between the king pin and the locking plate is prevented.

4. In combination, a plate having an opening therein adapted to receive a king pin, a locking plate pivotally mounted adjacent said opening, means whereby when the king pin moves into the opening, the king pin engages the locking plate and moves it to locking position, means to hold the locking plate in locked position, said locking plate engaging the back side of the king pin in locked position, a spring pressed yielding plunger mounted within the opening in the plate yieldably engaging the front side of the king pin whereby excessive inward movement of the king pin is prevented and slack motion between the king pin and the locking plate is prevented.

5. In combination, a plate having an opening therein adapted to receive a king pin, a locking plate pivotally mounted adjacent said opening, said locking plate having a recess therein and an arcuate formed surface formed thereon, a lever pivotally mounted on said plate member having a roller mounted thereon, said roller engaging against the arcuate surface of the locking plate, spring means to urge the roller into engagement with said locking plate, a shoulder on said locking plate adapted to engage against the roller to hold the locking plate from rotation in one direction, which rotation releases the king pin, the recess in said locking plate engaging the back side of the king pin in locked position, a spring pressed yielding plunger located in the opening in the plate engaging the front side of the king pin to prevent excessive inward movement thereof and to prevent slack motion between the king pin and the locking plate.

6. In combination, a plate having an opening therein adapted to receive a king pin, a locking plate, having a recess therein, pivotally mounted adjacent said opening in the plate, a lever pivotally mounted on the plate having a locking roller mounted thereon, said locking plate having an arcuate surface adjacent said recess, a second arcuate surface adjacent said first mentioned arcuate surface, a locking shoulder intermediate the two arcuate surfaces and a stop shoulder formed at the outer end of the second mentioned arcuate surface, said locking roller being yieldably urged toward the pivot of the locking plate, said stop shoulder resting against the locking roller when the locking plate is in unlocked position, inward movement of the king pin causing the locking plate to rotate causing the second mentioned arcuate surface to move past the locking roller until the locking roller drops behind the locking shoulder, this position being the locked position, further inward movement of the king pin moving the first mentioned surface along the roller, yieldable means tending to prevent this further inward movement of the king pin.

HENRY KETEL.